United States Patent [19]

Miyasaka et al.

[11] Patent Number: 5,569,537
[45] Date of Patent: Oct. 29, 1996

[54] LAMINATED GLASS WITH POLYURETHANE RESIN LAYER AND SILANE COUPLING AGENT LAYER

[75] Inventors: Seiichi Miyasaka; Hiroyuki Watanabe, both of Yokohama, Japan

[73] Assignees: Asahi Glass Company Ltd., Tokyo, Japan; Saint Gobain Vitrage, Courbevoie, France

[21] Appl. No.: 281,562

[22] Filed: Jul. 28, 1994

[30] Foreign Application Priority Data

Jul. 28, 1993 [JP] Japan .................. 5-204482

[51] Int. Cl.$^6$ .............. B32B 17/10; B32B 27/40
[52] U.S. Cl. ................ 428/425.5; 428/425.6; 428/428; 428/429
[58] Field of Search ............ 428/425.5, 425.6, 428/428, 429

[56] References Cited

U.S. PATENT DOCUMENTS

| | | | |
|---|---|---|---|
| 3,959,533 | 5/1976 | Kitaj | 427/386 |
| 4,041,208 | 8/1977 | Seeger et al. | 428/425.6 |
| 4,144,376 | 3/1979 | Beckmann et al. | 428/429 |
| 4,277,538 | 7/1981 | Beckmann et al. | 428/429 |
| 4,303,739 | 12/1981 | Beckmann et al. | 428/429 |
| 4,944,822 | 7/1990 | Ishikawa et al. | 156/212 |

FOREIGN PATENT DOCUMENTS

| | | |
|---|---|---|
| 0 171 917 | 2/1986 | European Pat. Off. . |
| 0 252 233 | 1/1988 | European Pat. Off. . |
| 0 548 775 | 6/1993 | European Pat. Off. . |

*Primary Examiner*—D. S. Nakarani
*Attorney, Agent, or Firm*—Oblon, Spivak, McClelland, Maier & Neustadt, P.C.

[57] ABSTRACT

A laminated glass having at least one glass sheet and at least one resin film or resin sheet bonded with a silane coupling agent layer interposed therebetween, wherein the silane coupling agent layer is a layer of a mixture comprising at least one silane coupling agent capable of providing bond strength for the bonding between the glass sheet and the resin film or resin sheet, and at least one silane coupling agent incapable of providing bond strength for the bonding between the glass sheet and the resin film or resin sheet.

12 Claims, 1 Drawing Sheet

LAMINATED GLASS WITH POLYURETHANE RESIN LAYER AND SILANE COUPLING AGENT LAYER

The present invention relates to laminated glass having controlled bond strength which is useful for e.g. vehicles such as automobiles and buildings, and a method for its production.

Laminated glass consisting of a glass sheet and a resin film or resin sheet (hereinafter generally referred to as a resin film) is known. It is also known to produce such laminated glass by coating a silane coupling agent capable of providing bond strength (i.e. capable of imparting bond strength) on the surface of a glass sheet to which a resin film is to be bonded, or by coating or incorporating a silane coupling agent capable of providing bond strength to the surface of a resin film to be bonded to a glass sheet.

The above prior art using a silane coupling agent capable of imparting bond strength is satisfactory from the viewpoint of firmly bonding the glass sheet and the resin film. However, it has been difficult or impossible to maintain the bond strength over a long period of time while securing the durability.

Penetration resistance and shock resistance are important requirements for laminated glass. The penetration resistance of laminated glass consisting of a glass sheet and at least one resin film, against shock at the time when a vehicle using such laminated glass is involved in a collision accident, depends largely on the above-mentioned bond strength.

Namely, if the bond strength is too high, the penetration resistance tends to be low, whereby a danger to the passenger of the vehicle increases. To secure the safety of the passenger, it will be necessary to increase the thickness of the resin film, but such is not economical since an extra material is required.

On the other hand, if the bond strength is low, the shock resistance tends to be poor, although the penetration resistance may be good. If an automobile or the like using such laminated glass is involved in a collision, glass fragments are likely to scatter, which is very dangerous.

in the above-mentioned conventional laminated glass, the silane coupling agent coated on the surface of the resin film or incorporated in the resin film, transfers or migrates to the interface between the glass sheet and the resin film to form a layer of the silane coupling agent therebetween, which serves to control the bond strength.

To obtain proper adhesive strength or bond strength solely with the silane coupling agent capable of providing bond strength, it is sufficient to incorporate the silane coupling agent in a very small amount at a level of from 0.05 to 0.2 wt. % to the resin-film. If it is incorporated in a larger amount, the bond strength will be unnecessarily high, whereby the penetration resistance tends to be low.

The present invention has been accomplished as a result of extensive studies on the basis of various observation results with respect to these problems inherent to the prior art. It is an object of the present invention to provide a method for producing laminated glass having the bond strength properly adjusted and having long lasting durability, whereby it is excellent in the safety i.e. in the penetration resistance and the shock resistance and it is also economically excellent.

Details of the mechanism for the above-mentioned deterioration of the bond strength between the glass sheet and the resin film in the conventional laminated glass, are unknown.

However, from repetition of various tests such as heat resistance test, light resistance test, water resistance test and weatherometer (WOM) resistance test with respect to such conventional laminated glass, it has been observed that deterioration of the bond strength between the glass sheet and the resin film is most remarkable in the water resistance test among such various tests.

In connection with the deterioration of the bond strength which occurs between the glass sheet and the resin film, this indicates (1) that the silane coupling bond is cleaved by an interaction of the heat, the ultraviolet ray and the water penetrated to the interface between the glass sheet and the resin film and (2) that by such an interaction, sodium ions in the glass elute to the surface of the glass, and such sodium ions dissolve the glass surface and further form foreign matters, which in turn cleave the silane coupling bond, thus leading to deterioration of the bond strength.

Therefore, the present inventors have considered that in order to prevent deterioration of the bond strength, it is essential to prevent penetration of water to the interface between the glass sheet and the resin film.

With the conventional laminated glass, water permeated through and penetrated into the resin film will be consumed by the silane coupling agent in the resin film, whereby water collected at the interface between the glass sheet and the resin film can be reduced. However, the number of bonds of the silane coupling agent at the interface is very small. Accordingly, it is considered that there still remain substantial spaces at the interface where water can readily be penetrated.

Therefore, for the purpose of simply preventing penetration of water, it is preferred to use a large amount of the silane coupling agent. However, if the silane coupling agent is used in a large amount, the bond strength tends to be so strong that the penetration resistance will deteriorate. From such a viewpoint, the problem of deterioration of the bond strength, penetration resistance and damage resistance can not be solved solely by the conventional silane coupling agent capable of providing the bond strength.

According to the present invention, the above problem has been solved by mixing a silane coupling agent incapable of providing bond strength for the bonding between the glass sheet and the resin film i.e. having no ability to bond the glass sheet and the resin film to a silane coupling agent capable of providing bond strength for the bonding of the glass sheet and the resin film in the method for producing laminated glass, to impart a bond strength reducing ability to the silane coupling agent.

Thus, the present invention provides a laminated glass having at least one glass sheet and at least one resin film or resin sheet bonded with a silane coupling agent layer interposed therebetween, wherein the silane coupling agent layer is a layer of a mixture comprising at least one silane coupling agent capable of providing bond strength for the bonding between the glass sheet and the resin film or resin sheet, and at least one silane coupling agent incapable of providing bond strength for the bonding between the glass sheet and the resin film or resin sheet.

Further, the present invention provides a method for producing a laminated glass having at least one glass sheet and at least one resin film or resin sheet bonded with a silane coupling agent layer interposed therebetween, which comprises coating on at least one of the surface of the glass sheet and the surface of the resin film or resin sheet a mixture comprising at least one silane coupling agent capable of providing bond strength for the bonding between the glass sheet and the resin film or resin sheet, and at least one silane coupling agent incapable of providing bond strength for the bonding between the glass sheet and the resin film or resin sheet, followed by drying, and then bonding the resin film or resin sheet and the glass sheet so that the surface having the mixture of the silane coupling agents coated thereon will be the bonded surface.

In the accompanying drawings.

Figure 1:
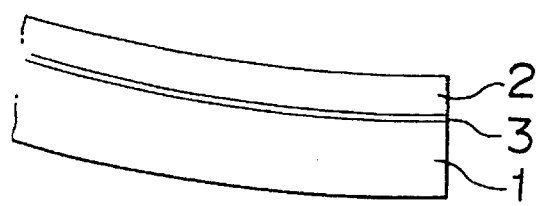
FIG. 1 is a cross sectional view illustrating an embodiment of the laminated glass produced by the present invention.

In this specification, "capable of providing bond strength" is meant for "having an ability to bond the glass sheet and the resin film, i.e., capable of imparting bond strength for the boding between the glass sheet and the resin film". Likewise "incapable of providing bond strength" is meant for "having substantially no ability to bond the glass sheet and the resin film, i.e., substantially incapable of imparting bond strength for the bonding between the glass sheet and the resin film". Hereinafter, a silane coupling agent capable of providing bond strength will be referred to simply as a silane coupling agent A, and a silane coupling agent incapable of providing bond strength will be referred to simply as a silane coupling agent B.

As mentioned above, in the preset invention, as opposed to the prior art wherein a silane coupling agent capable of providing bond strength is employed alone, a silane coupling agent incapable of providing bond strength to the resin film is mixed and used in combination therewith, whereby penetration of water can be prevented, deterioration of the bond strength can be reduced, the bond strength between the glass sheet and the resin film can be adjusted and controlled to a proper desired level so that the penetration resistance and the shock resistance as well as a long lasting durability can be maintained.

Here, the bond strength can be adjusted to a prescribed level by relatively altering the types of the silane coupling agent A and the silane coupling agent B or the blend proportions of the two. Accordingly, if the blend proportion of the silane coupling agent A is constant, it is possible to apply a total of silane coupling agents in a higher concentration than ever to their solubility limit in the solvent employed.

Therefore, it is readily possible to form a multilayer film of molecules of silane coupling agents which contributes to water proofness on a glass sheet, whereby it is possible to substantially completely prevent cleavage of the bonds due to elution from the glass. Further, not only the adhesive silane but also a hydrophobic silane will be densely present at the interface between the resin film and the glass sheet, whereby penetration of water to the interface will be prevented.

In the present invention, the silane coupling agent A is the one containing at least a group capable of bonding to the glass sheet and a functional group reactive with the resin film. On the other hand, the silane coupling agent B is the one containing at least a group capable of bonding to the glass sheet and no functional group reactive with the resin film or resin sheet. Since both the silane coupling agent A and the silane coupling agent B contain groups capable of bonding to the glass sheet the number of bonds of the silane coupling agents between the glass sheet and the silane coupling mixture layer is large, whereby penetration of water between the glass sheet and the silane coupling mixture layer will be prevented. On the other hand, the silane coupling agent A contains a functional group reactive with the resin film, but the silane coupling agent B contains no such functional group, whereby the number of bonds of the silane coupling agent between the resin film and the silane coupling mixture layer is not unnecessarily large, whereby deterioration of the penetration resistance due to unduly high bond strength, can be prevented.

As the silane coupling agent A to be used in the present invention, a silane compound of the following formula (1) may be employed:

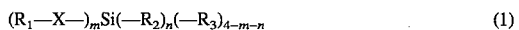

$$(R_1-X-)_m Si(-R_2)_n(-R_3)_{4-m-n} \qquad (1)$$

wherein $R_1$ is an amino group, an N-aminoalkyl-amino group, a glycidoxy group, an isocyanate group, an epoxycyclohexyloxy group or a mercapto group, X is a $C_{2-6}$ alkylene group, $R_2$ is an alkyl group, an aryl group, an arylalkyl group, an alkylaryl group or a hydrogen atom, $R_3$ is an alkoxy group, an aryloxy group or a chlorine atom, m is an integer of from 1 to 3, and n is an integer of from 0 to 2, provided that m+n is at most 3.

Besides the above-mentioned alkoxy group, the hydrolyzable group for the silane coupling agent may, for example, be an aryloxy group such as a phenoxy group, or a halogen atom such as chlorine.

Specific examples of such a silane coupling agent A include aminosilane coupling agents such as aminopropyl-tri(ethoxy)silane, aminopropyl-tri(methoxy)silane and N-aminoethyl-aminopropyl-tri(ethoxy)silane, epoxysilane coupling agents such as glycidoxypropyl-tri(methoxy)silane, glycidoxypropyl-tri(ethoxy)silane, (3,4-epoxycyclohexyl)ethyl-tri(methoxy)silane and (3,4-epoxycyclohexyl)ethyl-tri(ethoxy)silane, isocyanate silane coupling agents such as isocyanate propyl-tri(ethoxy)silane and isocyanate propyl-tri(methoxy)silane, and mercaptosilanes such as mercaptopropyl-tri(methoxy)silane and mercaptopropyl-tri(ethoxy)silane.

Among these silane coupling agents A, it is particularly preferred to employ, for example, amonopropyl-tri(ethoxy)silane (such as KBE903, manufactured by Shin-etsu Chemical Co., Ltd., or A-1100, manufactured by Nippon Yunika K.K.) or glycidoxypropyl-tri(methoxy)silane (such as KBM403, manufactured by Shin-etsu Chemical Co., Ltd., or A-187, manufactured by Nippon Yunika K.K.) when a polyurethane film is used as the resin film. When a glass sheet and a polyurethane film are bonded solely by these silane coupling agents, the bond strength between the glass sheet and the polyurethane film can be adjusted within a range of from 3 to 7 kg/cm.

On the other hand, as the silane coupling agent B, a silane compound of the following formula (2) may be employed.

$$(R_4-X-)_m Si(-R_2)_n(-R_3)_{4-m-n} \qquad (2)$$

wherein X is a $C_{2-6}$ alkylene group, $R_2$ is an alkyl group, an aryl group, an arylalkyl group, an alkylaryl group or a hydrogen atom, $R_3$ is an alkoxy group, an aryloxy group or a chlorine atom, $R_4$ is a perfluoroalkyl group or an alkyl group having at least 3 carbon atoms, m is an integer of from 1 to 3, and n is an integer of from 0 to 2, provided that m+n is at most 3.

Besides the above-mentioned alkoxy group, the hydrolyzable group for the silane coupling agent may, for example, be an aryloxy group such as a phenoxy group, or a halogen atom such as a chlorine atom.

Specific examples of such a silane coupling agent B include fluoroalkylsilane coupling agents such as 3,3,3- trifluoropropyl-tri(methoxy)silane, and long chain alkylsilane coupling agents such as dodecyl-tri(methoxy)silane.

When a glass sheet and a polyurethane film are bonded solely by these silane coupling agents B, the bond strength between the glass sheet and the polyurethane film can be adjusted within a range of from 0.1 to 0.5 kg/cm. On the other hand, when no silane coupling agent is present, the bond strength between the glass sheet and the polyurethane film is at a level of from 0.2 to 0.3 kg/cm. Therefore, the above coupling agents are suitable for use as the silane coupling agent B.

These silane coupling agents have substantially no bond strength to the resin film.

The ability of the silane coupling agent A to impart bond strength and the ability of the silane coupling agent B to reduce the bond strength vary depending upon not only the types of the functional groups of these silane coupling agents but also the concentrations of the silane coupling agents. However, the bond strength can be controlled primarily by adjusting the relative proportions of the two agents.

Further, the bond strength varies depending upon the type, the hardness and the thickness of the resin film to be used and the type of the glass sheet to be used. However, to control the bond strength, it is simply required to select the most suitable types and blend proportions of the silane coupling agents depending upon the particular purpose. The blend proportions (mixing ratio) may vary also depending upon the coating method. Accordingly, the blend proportions may be predetermined so that the agents may be premixed. Otherwise, it is possible to determine the blend proportions at the working site depending upon the manner of coating.

As a result of various studies, it has been found that according to the present invention, the bond strength can be controlled within a range of from 0.1 to 7 kg/cm (180° peeling value; hereinafter the bond strength is indicated by 180° peeling value) by using the mixture of such two types of silane coupling agents.

The mixture of these silane coupling agents will be coated on at least one of the bond surfaces of the glass sheet and the resin film. The behaviors of the silane coupling agent A and the silane coupling agent B to the glass sheet are the same, but the behaviors of the silane coupling agent A and the silane coupling agent B to the resin film are different. Therefore, the mixture of the silane coupling agents is preferably coated on the glass sheet, whereby the mixture can uniformly be coated.

Further, the resin film may sometimes be laminated on a glass sheet in such a manner that a resin solution is preliminarily coated and cured on the glass surface. In such a case, the mixture of the silane coupling agents, may be coated on the glass sheet. Such a process may comprise coating and drying the mixture of the silane coupling agents on the glass surface, then coating the resin solution on the coated surface of the mixture of the silane coupling agents and then curing the resin solution.

When the mixture of the silane coupling agents is to be coated on the glass sheet or the resin film, such a mixture of the silane coupling agents may take various forms such as a solution having the mixture dissolved in a solvent, or a dispersion having the mixture dispersed in a solution.

In such a case, the solvent for the solution or the dispersion may be water or an organic solvent such as methanol, ethanol, methylene chloride or acetone, depending upon the types and the blend proportions of the components constituting the mixture. Such solvents may be used alone or in combination as a mixture of two or more of them.

In the present invention, the glass sheet is not particularly limited so long as it is of inorganic type. Various types of glass may be used such as unfabricated glass sheets, those subjected to reinforcement treatment such as peripherally tempered or entirely tempered, and those entirely or partially covered with a coating film for heat reflection, electrical conductivity or coloring. Further, a laminated glass having a plurality of glass sheets laminated with interlayers of e.g. polyvinyl buryral interposed therebetween, or a multilayer glass having a plurality of glass sheets assembled with spacers therebetween, may be used as the glass sheet in the present invention. When such a glass sheet is employed, the surface to be bonded with the resin film is of course an inorganic glass sheet.

The thickness of the glass sheet is usually from 1.0 to 5.0 mm in the case of window glass for automobiles. In the case of window glass for buildings, the thickness may sometimes exceed 10.0 mm. The thickness may optionally be selected depending upon the particular application of the laminated glass to be produced.

Various types of resins may be used for the resin film constituting the laminated glass of the present invention irrespective of their thermoplastic or thermosetting nature. Specific examples of the resin film include polyurethane, polyvinyl butyral, polyethylene terephthalate, poly(ethylene-vinyl acetate) copolymer films. Polyurethane resin films are particularly preferred when various aspects such as safety, durability, optical properties and adaptability to complex shapes are taken into accounts.

Such a resin film may not necessarily be a single layer film and may be the one having resin films of the same type or different types laminated into a unitary structure. When various aspects such as safety, durability, optical properties and adaptability to a complex shape, are taken into account, it is particularly preferred to employ a resin film having a three layer structure composed mainly of a partially crosslinked urethane resin obtained by a reactive casting method as disclosed in e.g. Japanese Examined Patent Publication No. 51922/1990.

As another preferred embodiment of the resin film of the present invention, a polyurethane film having an adhesive or a tackifier on one side thereof may be mentioned. Particularly preferred is a double-layer polyurethane film having an adhesive or a tackifier on the exterior surface of one of the two layers.

It is preferred that one of the two polyurethane resin layers is a polyurethane resin layer having a good mechanical property, particularly a polyurethane resin layer having a good energy absorbing property and penetration resistance, and the other polyurethane resin layer is made of a polyurethane resin having a good surface property, particularly a good self-healing surface property. Particularly preferred as a polyurethane resin having a good surface property is a polyurethane resin having a self-healing property. Such a polyurethane resin is disclosed, for example, in Japanese Examined Patent Publications No. 2879/1988, No 31361/1988, No. 60990/1987, No. 60989/1987 and No. 27050/1982 and Japanese Unexamined Patent Publication No. 71252/1985. In such a case, it is possible to provide a safety glass which is excellent in the safety against collision and is highly resistant against scratching, by laminating the double-layer film so that the layer with a good energy absorbing property and high penetration resistance is located on the glass sheet side, and the layer with a good self-healing property constitutes the exposed surface.

The polyurethane resin layer having a good energy absorbing property and penetration resistance which is on the glass sheet side, preferably has an adhesive layer or a tackifier layer on the glass sheet side surface.

The adhesive or tackifier includes the following examples. Polyurethane resin obtained from acrylic polyol (or acrylated alkyd polyol) and non-yellowing polyisocyanate. Silicone-modified acrylic resin. Thermoplastic urethane resin obtained from polyester diol, chain extender, and non-yellowing diisocyanate. They may be of thermoplastic type, non-crosslinking type, one-pack crosslinking type, two-pack crosslinking type, or emulsion type. These examples are not limitative. Any material can be used which undergoes deformation by pressure or heat at the time of lamination to a substrate and exhibits the adhesive or sticking properties. A preferred example is a weather-resistant thermoplastic polyurethane resin which is obtained from non-yellowing polyisocyanate.

Further, such a resin film may be the one partially or entirely subjected to various treatments such as surface hardening treatment, coloring treatment, heat reflection treatment or treatment for imparting electrical conductivity.

As a method for coating the mixture of the silane coupling agents on the surface of the glass sheet (or the resin film), it is possible to employ dipping, spraying, sponge-coating or any other various methods. However, from various viewpoints including control to a predetermined dimensional precision and operation efficiency, it is preferred to employ a method wherein the mixture is coated on the glass surface and at the same time, it is wiped off with a dry cloth such as a dust-free cloth.

In the foregoing, the laminated glass has been described mainly with respect to the one to be used for a vehicle such as an automobile. However, the laminated glass according to the present invention is not limited to the application for vehicles. It can of course be used for buildings, bulletproof, aircrafts such as helicopters, submarine architecture and water tanks. In such a case, the types of the two silane coupling agents, the proportions and other conditions may suitably be selected depending upon various requirements for the respective applications.

Now, the present invention will be described with reference to Examples and drawings. However, it should be understood that the present invention is by no means restricted to such specific Examples.

Figure 2:
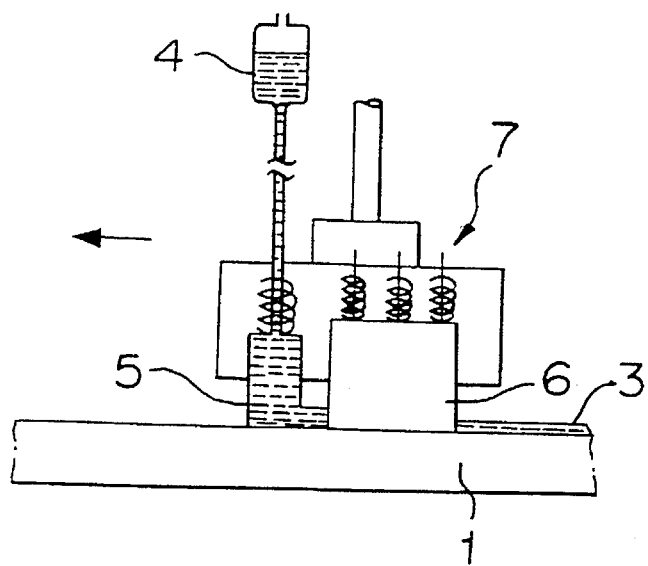
FIG. 2 is a schematic view illustrating an apparatus for coating a mixture of silane coupling agents to a glass sheet.
Figure 3:
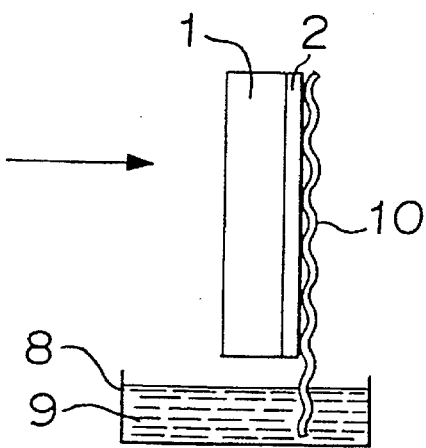
FIG. 3 is a schematic view of the sunshine weatherometer used for measuring the bond strength of the laminates produced in Examples and Comparative Examples.

FIG. 1 is a cross sectional view illustrating an embodiment of the laminated glass to be produced by the present invention, FIG. 2 is a schematic view of an apparatus to be used for coating the mixture of the silane coupling agents to a glass sheet and bonding a resin sheet thereto, and FIG. 3 is a schematic view of the sunshine weatherometer used for measuring the bond strength of the laminated glass produced by the Examples.

In the Figures, reference numeral 1 indicates a glass sheet. This glass sheet 1 is a float glass of 3.5 mm in thickness, which was cut and beat to be used as a windshield for an automobile. Reference numeral 2 is a polyurethane resin film with self-healing property, and numeral 3 is a layer of the mixture of silane coupling agents applied on the concave surface of the glass sheet 1. Reference numeral 4 is a mixed solution of the silane coupling agents, and numeral 5 is a means for coating the mixed solution. Reference numeral 6 indicates the section where an excess or unnecessary mixed solution is wiped off, and numeral 7 indicates the operation section for the coating robot. In FIG. 3, reference numeral 8 is a water tank, and numeral 10 is a gauze wetted with water.

EXAMPLE 1

In this Example 1, the layer 3 of the mixture of the silane coupling agents was formed on the glass sheet 1 by the following process steps.

Firstly, aminosilane (KBE903, manufactured by Shin-etsu Chemical Co., Ltd.) composed essentially of aminopropyl-tri(ethoxy)silane as the silane coupling agent A, and a fluorine-containing silane (KMB7103, manufactured by Shin-etsu Chemical Co., Ltd.) composed essentially of 3,3,3-trifluoropropyl-tri(methoxy)silane as the silane coupling agent B were mixed in a blend ratio of 1:2, and the mixture was dissolved in a mixed solution of water and ethanol in a mixing ratio of 1:4 to obtain a 0.5 wt. % solution thereof.

In this case, the mixed solution serves as a solvent, whereby water is used for improving the adhesion between the silane coupling agents and the glass, while ethanol is used to facilitate the wiping off operation.

Then, the mixture of the silane coupling agents was applied to the glass sheet surface. In such a case, in order to enhance the adhesion of the mixture, it is preferred to make the surface of the glass as active as possible by polishing the surface of the float glass facing to the air layer with an aqueous cerium oxide solution, rinsing it with pure water, followed by drying with hot air. This treatment was performed as well in this Example.

Then, using a coating robot, while moving the coating tool equipped, at its forward end, with a coating member 5 for coating the solution 4 of the mixture of the silane coupling agents and a wiping member 6, in the direction shown by the arrow in FIG. 2, by the operational unit 7 of the robot, the solution 4 of the mixture of the silane coupling agents was coated on the surface of the glass 1 and the upper surface was wiped off, by the tool, to form a transparent layer of the silane coupling agents.

Thereafter, a polyurethane film A (a self-healing highly elastic thermoset polyurethane film disclosed in the specification of Japanese Examined Patent Publication No. 51922/1990, of which the 50% modulus value is 25 kg/cm$^2$) was bonded thereto by a vacuum lamination technique as disclosed in U.S. Pat. No. 4,944,822, which was then treated in an autoclave at a temperature of 140° C. under a pressure of 8 kg/cm$^2$ for 30 minutes.

Subsequently, to stabilize the bond strength, the laminate was cured at room temperature for 2 weeks to obtain a laminate glass (as a windshield glass for an automobile) as shown in FIG. 1.

Then, the laminated glass prepared by the above various steps was subjected to a collision safety test and a bond strength test.

Firstly, for the collision safety test, the laminated glass was fixed as a test sample to a tool. A dummy was collided to the film-coated side of the laminated glass at a speed of 48 kg/hr by thread firing device at a temperature of 20° C. The dummy did not penetrate into the test sample. The value of encephalopathy of the dummy was less than that of the test sample, and no dermal damage was observed.

It is evident from the results that the laminated glass obtained by the method of the present invention has excellent collision safety. Further, after the collision test, the broken portion of the laminated glass was cut out, and the distribution of the bond strength over the entire test sample was measured, whereupon it was found that the bond strength was uniformly distributed within a range of from 1.5 to 2.0 kg/cm.

Then, this test sample was subjected to an outdoor weathering test. Further, it was aged by using a sunshine weatherometer and a xenon weatherometer, and then subjected to the bond strength test. The results are shown in Table 1. Table 1 also shows haze data.

The haze of a windshield glass for an automobile is preferably not higher than 0.5% from the viewpoint of safety.

The conditions for these tests were as follows.
(1) Outdoor weathering test: in Yokohama city; facing to the south; inclined by 45° with respect to vertical line; outdoor weathering time of two years.
(2) Sunshine weatherometer test: using the sunshine weatherometer shown in FIG. 3; the temperature of the black panel thereof was set to 83° C.; the ultraviolet light was radiated from the glass side while the gauze 10 wet with water 9 was adhered thereto; the radiation time was 2000 hours.
(3) Xenon weatherometer test: performed in accordance with SEA-J-1885; radiated from the glass side was the ultraviolet light approximated to the spectral energy of the sun and the standard light source $D_{65}$; dark room cycle (1 hr)/light cycle (3.8 hr); the temperature and the relative humidity of the black panel were automatically controlled at 38±2° C. and 50±5%, respectively; the same tests were repeated for two durations, 2000 hours and 6000 hours.

As apparent from Table 1, the retention of the bond strength was: 90% in the outdoor weathering test, 80% in the sunshine weatherometer test and 95% and 90% in the xenon weatherometer tests for 2000 and 6000 hours, respectively, (the latter corresponds to the outdoor weathering time of 10 years), all of which indicate excellent results. In addition, the value of the bond strength at that time ranges between 1.4 and 1.8 kg/cm, which indicates that glass fragments will not scatter when the vehicle is involved in a collision and that the penetration resistance is in a satisfactory level.

EXAMPLE 2

A laminated glass structure was prepared in the same manner as in Example 1 except that the urethane film A in Example 1 was changed to a urethane film B, and a 0.5 wt. % solution of a mixture comprising the aminosilane and the fluorine-containing silane in a mixing ratio of 1:4, was used. A test sample thereof was subjected to the same tests as in Example 1. The results are shown in Table 1. It is evident from the Table that the test results were excellent as in Example 1.

The above-mentioned polyurethane film B is, like the polyurethane film A, a self-healing highly elastic thermosetting polyurethane film as disclosed in Japanese Examined Patent Publication No. 51922/1990, and its 50% modulus value is 130 kg/cm². Thus, it is a polyurethane film having an elasticity higher than the polyurethane film A.

EXAMPLE 3

A laminated glass structure was prepared in the same manner as in Example 1 except that the 0.5 wt. % solution of the mixture in Example 1 was changed to a 0.8 wt. % solution of the mixture. A test sample thereof was subjected to the same tests as in Example 1. The results are shown in Table 1. It is evident from the Table that the test results were excellent as in Example 1.

COMPARATIVE EXAMPLE 1

A laminated glass structure was prepared in the same manner as in Example 1 except that a 0.05 wt. % solution of the silane coupling agent A only was applied to the urethane film A side and no application of the silane coupling agent to the glass sheet was conducted. A test sample thereof was subjected to the same tests as in Example 1. The results are shown in Table 1.

According to the results, the initial bond strength was the same as in Examples 1 and 2, but the bond strength decreased drastically i.e. 15% in the outdoor weathering test, 30% in the sunshine weatherometer test and 25% and 30% in the xenon weatherometer tests for 2000 and 6000 hours, respectively. Thus, it is apparent that the durability is inadequate.

COMPARATIVE EXAMPLE 2

A laminated glass structure was prepared in the same manner as in Example 2 except that instead of coating the solution of the mixture of the silane coupling agents by means of the coating robot, a spray (Wider #61, manufactured by Iwata Corporation) was attached to the forward end of the operational unit of the coating robot, and the solution of the mixture of the coupling agents was coated on the glass surface and then dried in air without conducting the wiping treatment. A test sample thereof was subjected to the same tests as in Example 1. The results are shown in Table 1.

With the test sample of this Comparative Example 2, the initial bond strength can be controlled in the same manner as in Example 1, but the durability was inadequate. Further, the haze deteriorated mainly because no wiping treatment was carried out after the coating by spraying, and the silane coupling agent was coagulated and solidified on the glass sheet surface.

COMPARATIVE EXAMPLE 3

A laminated glass structure was prepared in the same manner as in Comparative Example 2 except that the urethane form B was changed to the urethane form A, and the composition of the mixtures of the silane coupling agents was the same as in Example 1. A test sample thereof was subjected to the same tests as in Example 1. The results are shown in Table 1.

It is evident from the results that the initial bond strength was slightly lower than in Example 1, and the durability was inadequate. Further, the haze deteriorated.

COMPARATIVE EXAMPLE 4

A laminated glass structure was prepared in the same manner as in Comparative Example 3 except that the silane coupling agent A was contained in an amount of 0.5 wt. %, and only water was used as the solvent. A test sample thereof was subjected to the same tests as in Example 1. The results are shown in Table 1. In this case, only the silane coupling agent A was used, whereby the bond strength was so high that the penetration resistance was low, and some dermal damages were observed. Further, the durability was inadequate, and the haze increased so much that the product was considered not suitable as a windshield glass for an automobile.

COMPARATIVE EXAMPLE 5

A laminated glass structure was prepared in the same manner as in Comparative Example 4 except that instead of the water solvent, ethanol was used as the sole solvent. A test sample thereof was subjected to the same tests as in Example 1. The results are shown in Table 1. In this Example, no haze was observed, but the initial bond strength was so high that the penetration resistance deteriorated as in Comparative Example 4. Further, the durability was inadequate.

TABLE 1

| Case No. | Thread Penetration | Thread Damage | Haze (%) | Bond strength (kg/cm) | Retention of bond strength (%) 1 | 2 | 3 | 4 |
|---|---|---|---|---|---|---|---|---|
| Example 1 | None | None | 0.1 | 1.5–2.1 | 90 | 80 | 95 | 90 |
| Example 2 | None | None | 0.1 | 1.5–2.0 | 90 | 95 | 95 | 90 |
| Example 3 | None | None | 0.1 | 1.5–2.0 | 90 | 95 | — | — |
| Comparative Example 1 | None | None | 0.1 | 1.5–2.0 | 15 | 30 | 25 | 30 |
| Comparative Example 2 | None | None | 0.3 | 1.5–2.0 | — | 40 | — | — |
| Comparative Example 3 | None | None | 0.2 | 1.0–1.5 | 20 | — | — | — |
| Comparative Example 4 | Found | Found | 0.5 | 2.5–3.0 | — | 30 | — | — |
| Comparative Example | Found | Found | 0.1 | 2.0–2.5 | — | 25 | — | — |

(Note)
1. In Table, "Thread" means "thread collision test", in which the dummy was collided with the film layer side of the glass laminate through the thread firing device at a speed of 48 km/hr at a temperature of 20° C.
In the column of "Thread", "Penetration" an "Damage" represent the presence or the absence of "penetration" and "dermal damage" as visually observed.
2. In the column of "Retention of bond strength", the number 1 through 4 are test numbers and the conditions in each test are as follows:
 (1) Test 1: outdoor weathering for two years
 (2) Test 2: 83° C., w-WOM 2000 H (the ultraviolet light was radiated with the humidity kept at 100%)
 (3) Test 3: X-WOM (SAE-J-1885) 2000 H
 (4) Test 4: X-WOM (SAE-J-1885) 6000 H
3. The bond strength was determined according to a peel technique at the temperature of 23±2° C. and at the relative humidity of 55±5% RH.

As is apparent from Examples and Comparative Examples, it has been made possible to adjust the bond strength while maintaining the durability by using the silane coupling agents of the present invention. In order to obtain such effects effectively, it is advisable to adopt a treating method whereby the film thickness of the mixture of the silane coupling agents can be controlled as thin as possible to avoid the haze by wiping off an excess or unnecessary portion of the mixture after coating it. With the foregoing construction, the present invention is capable of securing the durability for a long period of time while adjusting the bond strength between the glass sheet and the resin film in the laminated glass to a proper level.

We claim:

1. A laminated glass having at least one glass sheet and at least one polyurethane resin film or sheet bonded with a silane coupling agent layer interposed therebetween, wherein said silane coupling agent layer is a layer of a mixture comprising at least one silane coupling agent capable of providing bond strength for the bonding between said glass sheet and said resin film or sheet, and at least one silane coupling agent incapable of providing bond strength for the bonding between said glass sheet and said resin film or sheet, which has a formula

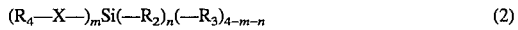

$(R_4-X-)_m Si(-R_2)_n (-R_3)_{4-m-n}$ (2)

wherein
X is a $C_{2-6}$ alkylene group,
$R_2$ is an alkyl group, an aryl group, an arylalkyl group, an alkylaryl group or a hydrogen atom,
$R_3$ is an alkoxy group, an aryloxy group or a chlorine atom,
$R_4$ is a perfluoroalkyl group,
m is an integer of from 1 to 3, and
n is an integer of from 0 to 2, provided that m+n is at most 3.

2. The laminated glass according to claim 1, wherein the silane coupling agent capable of providing bond strength for the bonding between the glass sheet and the polyurethane resin film or sheet contains at least a group capable of bonding to the glass sheet and a functional group reactive with the resin film or sheet, and the silane coupling agent incapable of providing bond strength to the bonding between the glass sheet and the resin film or sheet contains at least a group capable of boding to the glass sheet and no functional group reactive with the resin film or sheet.

3. The laminated glass according to claim 1, wherein the silane coupling agent capable of providing bond strength for the bonding between the glass sheet and the resin film or resin sheet is a compound of the following formula (1)

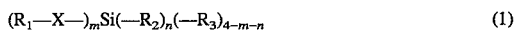

$(R_1-X-)_m Si(-R_2)_n (-R_3)_{4-m-n}$ (1)

wherein $R_1$ is an amino group, an N-aminoalkyl-amino group, a glycidoxy group, an isocyanate group, an epoxy-cyclohexyloxy group or a mercapto group, X is a $C_{2-6}$ alkylene group, $R_2$ is an alkyl group, an aryl group, an arylalkyl group, an alkylaryl group or a hydrogen atom, $R_3$ is an alkoxy group, an aryloxy group or a chlorine atom, m is an integer of from 1 to 3, and n is an integer of from 0 to 2, provided that m+n is at most 3.

4. The laminated glass according to claim 1, wherein the resin film or sheet comprises at least a polyurethane resin film layer with self-healing property.

5. The laminated glass of claim 1, wherein said silane coupling agent capable of providing bond strength for the bonding between said glass sheet and said resin film or sheet is selected from the group consisting of aminopropyl-tri-(ethoxy)silane, aminopropyl-tri(methoxy)silane, N-amino-ethyl-aminopropyl-tri(ethoxy)silane, glycidoxypropyl-tri-(methoxy)silane, glycidoxypropyl-tri-ethoxy)silane, (3,4-epoxycyclohexyl)ethyl-tri(methoxy)silane, (3,4-epoxycyclohexyl)ethyl-tri(ethoxy)silane, isocyanate propyl tri-(ethoxy)silane, isocyanate propyl tri-(methoxy)silane, mercaptopropyl-tri(methoxy)silane, mercaptopropyl-tri-(ethoxy)silane and a mixture thereof.

6. The laminated glass of claim 1, wherein a bond strength between said at least one glass sheet and said at least one polyurethane resin film or sheet is from 0.1 to 7 kg/cm, 180° peeling value.

7. A laminated glass having
 1) at least one glass sheet and
 2) at least one polyurethane resin film or sheet bonded with a silane coupling agent layer interposed therebetween, wherein aid silane coupling agent layer is a layer of a mixture comprising:
 at least one silane coupling agent capable of providing bond strength for the bonding between said glass sheet and said resin film or sheet, and
 at least one silane coupling agent incapable of providing bond strength for the bonding between said glass sheet and said resin film or sheet which is selected from the group consisting of 3,3,3-trifluoropropyl-tri(methoxy)silane, dodecyl tri(methoxy)silane and a mixture thereof.

8. The laminated glass according to claim 7, wherein said silane coupling agent capable of providing bond strength for the bonding between said glass sheet and said polyurethane resin film or sheet contains at least a group capable of bonding to said glass sheet and a functional group reactive with said polyurethane resin film or sheet, and said silane coupling agent incapable of providing bond strength to the bonding between said glass sheet and said polyurethane resin film or sheet contains at least a group capable of bonding to said glass sheet and no functional group reactive with said polyurethane resin film or sheet.

9. The laminated glass according to claim 7, wherein said silane coupling agent capable of providing bond strength for the bonding between said glass sheet and said polyurethane resin film or resin sheet is a compound of the following formula (1):

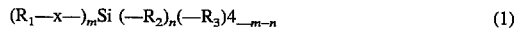 (1)

wherein $R_1$ is an amino group, an N-aminoalkyl-amino group, a glycidoxy group, an isocyanate group, an epoxycyclohexyloxy group or a mercapto group, X is a $C_{2-6}$ alkylene group, $R_2$ is an alkyl group, an aryl group, an arylalkyl group, an alkylaryl group or a hydrogen atom, $R_3$ is an alkoxy group, an aryloxy group or a chlorine atom, m is an integer of from 1 to 3, and n is an integer of from 0 to 2, provided that m+n is at most 3.

10. The laminated glass according to claim 7, wherein said polyurethane resin film or sheet comprises at least a polyurethane resin film layer with self-healing property.

11. The laminated glass of claim 7, wherein said silane coupling agent capable of providing bond strength for the bonding between said glass sheet and said resin film or sheet is selected from the group consisting of aminopropyl-tri-(ethoxy)silane, aminopropyl-tri(methoxy)silane, N-aminoethyl-aminopropyl-tri(ethoxy)silane, glycidoxypropyl-tri-(methoxy)silane, glycidoxypropyl-tri-ethoxy)silane, (3,4-epoxycyclohexyl) ethyl-tri(methoxy)silane, (3,4-epoxycyclohexyl)ethyl-tri(ethoxy)silane, isocyanate propyl tri-(ethoxy)silane, isocyanate propyl tri-(methoxy)silane, mercaptopropyl-tri(methoxy)silane, mercaptopropyl-tri-(ethoxy)silane and a mixture thereof.

12. The laminated glass of claim 7, wherein a bond strength between said at least one glass sheet and said at least one polyurethane resin film or sheet is from 0.1 to 7 kg/cm, 180° peeling value.

* * * * *